(12) United States Patent
Viitanen

(10) Patent No.: US 12,353,662 B1
(45) Date of Patent: Jul. 8, 2025

(54) METHOD AND SYSTEM FOR PREVENTING ACCIDENTAL TOUCH INPUT RESPONSES

(71) Applicant: Varjo Technologies Oy, Helsinki (FI)

(72) Inventor: Jaakko Viitanen, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/648,593

(22) Filed: Apr. 29, 2024

(51) Int. Cl.
*G06F 3/041* (2006.01)
*G06F 3/0354* (2013.01)

(52) U.S. Cl.
CPC ........ *G06F 3/0418* (2013.01); *G06F 3/03547* (2013.01)

(58) Field of Classification Search
CPC ............................ G06F 3/0418; G06F 3/03547
See application file for complete search history.

(56) References Cited

U.S. PATENT DOCUMENTS 10,531,394 B2 * 1/2020 Min ...................... G06F 1/3262

\* cited by examiner

*Primary Examiner* — Michael Pervan
(74) *Attorney, Agent, or Firm* — Ziegler IP Law Group, LLC.

(57) ABSTRACT

A method for preventing accidental touch input responses includes detecting a provision of a first touch input on a touch-sensitive element; detecting whether a second touch input is provided on the touch-sensitive element during a first time period, wherein the first time period is a time duration in which the first touch input is provided; and generating a control signal for implementing at least one functionality for a head-mounted display device and/or an accessory associated with the HMD device, based on the second touch input, when it is detected that the second touch input is provided on the touch-sensitive element during the first time period.

10 Claims, 2 Drawing Sheets

METHOD AND SYSTEM FOR PREVENTING ACCIDENTAL TOUCH INPUT RESPONSES

TECHNICAL FIELD

The present disclosure relates to methods for preventing accidental touch input responses. The present disclosure also relates to systems for preventing accidental touch input responses.

BACKGROUND

Touch-sensitive interfaces have become prevalent in modern electronic devices, revolutionising the way users interact with technology. From smartphones and tablets to wearable gadgets and head-mounted display (HMD) devices, touch-sensitive elements offer convenient means of controlling devices and navigating through digital content. Typically, the HMD devices and their associated accessories represent a growing category of devices that rely on touch-sensitive interfaces for user interaction. Therefore, the focus has been on developing technologies that improve touch interaction processes and addresses challenges such as accidental touch activations.

However, existing methods for preventing accidental touch input responses are associated with several limitations. Firstly, by making touch areas less responsive, users may experience difficulties in accurately interacting with touch-sensitive elements. Such a reduction in sensitivity hinders an overall usability of devices (such as HMD devices), as the users need to exert more force or precision to trigger desired actions. This results in deteriorating an overall experience of the users using the HMD devices. Secondly, decreasing the touch sensitivity to prevent any accidental touches also limit a range of functionalities and interactions available to the users. Thus, the users miss out on features or gestures that require more delicate touch inputs, reducing the device's overall utility and versatility. Furthermore, in some devices, touch gestures are used for various functions, including answering calls, adjusting volume, and activating virtual assistants. While these touch-sensitive controls offer convenience, they heavily rely on specific physical gestures, which introduces complexity in user interaction. Thus, the users may need to learn and remember specific gestures or actions required to interact with a particular device, thereby adding a cognitive load and potentially increasing a likelihood of user errors. Moreover, in other devices, a significant number of safeguards are often added in software implementations for preventing the accidental touch input responses. For example, safety timeouts are added to introduce a delay between an activation of an initial touch input and an activation of a subsequent touch input. Such a delay though prevents a premature activation or dismissal of a feature corresponding to a touch input, also introduces usage complexity, user frustration, and a risk of false positives or negatives in touch input recognition. In some cases, an activation of a given touch input only occurs when certain conditions are satisfied, for example, it is verified whether an HMD is correctly positioned on user's head and is stationary, or eye-tracking calibration is successfully performed by the HMD. Despite such safeguards, complete elimination of accidental touch input responses is difficult, particularly in dynamic environments.

Therefore, in light of the foregoing discussion, there exists a need to overcome the aforementioned drawbacks.

SUMMARY

The aim of the present disclosure is to provide a method and a system which facilitate a simple, yet accurate and reliable way for preventing accidental touch inputs, thereby ensuring implementation of intended functionalities, and improving an overall user experience. The aim of the present disclosure is achieved by a method and a system for preventing accidental touch input responses, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
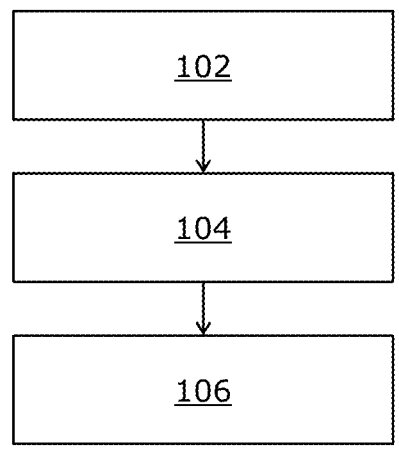
FIG. 1 illustrates steps of a method for preventing accidental touch input responses, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for preventing accidental touch input responses, the method comprising:
  detecting a provision of a first touch input on a touch-sensitive element;
  detecting whether a second touch input is provided on the touch-sensitive element during a first time period, wherein the first time period is a time duration in which the first touch input is provided; and
  generating a control signal for implementing at least one functionality for at least one of: a head-mounted display device, an accessory associated with the head-mounted display device, based on the second touch input, when it is detected that the second touch input is provided on the touch-sensitive element during the first time period.

In a second aspect, the present disclosure provides a system for preventing accidental touch input responses, wherein the system comprises:
  a touch-sensitive element; and
  at least one processor coupled to the touch-sensitive element, wherein the at least one processor is configured to:
    detect a provision of a first touch input on the touch-sensitive element;

detect whether a second touch input is provided on the touch-sensitive element during a first time period, wherein the first time period is a time duration in which the first touch input is provided; and generate a control signal for implementing at least one functionality for at least one of: a head-mounted display device, an accessory associated with the head-mounted display device, based on the second touch input, when it is detected that the second touch input is provided on the touch-sensitive element during the first time period.

The present disclosure provides the aforementioned method and the aforementioned system which facilitate a simple, yet accurate and reliable way for preventing accidental touch input responses. Herein, the method and the system involve in detecting the first touch input on the touch-sensitive element and then determining whether the second touch input is provided during the first time period. Thus, only when the second touch input is detected within the time period while the first touch input is continuously active, the control signal is generated to implement a given functionality. Beneficially, this facilitates in preventing unintended software events triggered by accidental touches on a touch-sensitive area of the touch-sensitive element that the user cannot see, for example, when the HMD device is worn by the user on his/her head. Moreover, this allows for the use of taps and gestures with one finger while keeping another finger stationary on the touch-sensitive element, ensuring a touch safety. Additionally, the method may cater to the user using the HMD device and/or the accessory associated with the HMD device, by enabling the user to locate the touch-sensitive element through touch alone and to perform specific actions (for example, such as tapping for menu display, double tapping for mode switching, or long tapping for muting a microphone), whilst minimising accidental touch events. This improves an overall viewing experience of the user, for example, within an extended-reality (XR) environment provided by the HMD device. The method and the system are simple, robust, fast, reliable, support real-time prevention of accidental touch input responses, and can be implemented with ease.

Throughout the present disclosure, the term "accidental touch input response" refers to an unintended action that is triggered by an unintentional touch input provided on the touch-sensitive element. The accidental touch input responses may be accidental taps, accidental swipes, or the like that occur when a user unintentionally contacts (namely, touches) the touch-sensitive element. Such accidental touch input responses can result in triggering of unwanted functionalities for the at least one of: the head-mounted display (HMD) device, the accessory associated with the HMD device. Such unwanted functionalities may, for example, be activation of some unintended functions or commands, navigations to unintended locations within a user interface, and the like. Thus, the accidental touch input responses disrupts an overall experience of a user using the at least one of: the HMD device, the accessory associated with the HMD device.

Throughout the present disclosure, the term "touch-sensitive element" refers to a component that is capable of detecting and responding to a touch input. The touch-sensitive element may be implemented in various ways, for example, such as capacitive sensors, resistive sensors, surface acoustic wave sensors, optical sensors, pressure-sensitive sensors, and the like. Touch-sensitive elements and their implementations are well-known in the art.

Optionally, the touch-sensitive element is implemented on at least one of:
a side of the head-mounted display device,
the accessory associated with the head-mounted display device,
a standalone device,
a wearable device.

In this regard, the touch-sensitive element could be implemented on any one of: a left side, a right side, a top side, of the HMD device. This may allow the user to interact within an extended-reality (XR) environment presented by the HMD device, by providing touch inputs on a side surface of the HMD device, without obstructing his/her view or requiring an additional hand movement. Implementing the touch-sensitive element on the side of the HMD device may result in having an ergonomic design of the HMD device, which may provide convenience and comfort for providing the touch inputs, even during a prolonged use of the HMD device. Additionally, optionally, the touch-sensitive element may be implemented on (a surface of) the accessory associated with the HMD device. Examples of the accessory associated with the HMD device may include, but are not limited to, a handheld XR controller, an audio device, a microphone. Accessories associated with the HMD device are well-known in the art. Implementing the touch-sensitive element on the accessory may be beneficial in a scenario when the user is using the HMD device for gaming purposes. Furthermore, optionally, the touch-sensitive element may also be implemented on the standalone device that is separate from the HMD device. The standalone device may be implemented as a touch-sensitive pad. The standalone device may be equipped with a circuitry that is self-sufficient for providing touch inputs for interacting within the XR environment presented by the HMD device, without relying on any external peripherals. Furthermore, optionally, the touch-sensitive element may also be implemented on the wearable device that can be worn by the user on his/her hand or arm in a similar manner such as a smartwatch, a fitness tracker, or any other wearable gadget. This allows the user to interact within the XR environment through the touch inputs accordingly. Such a proximity-based interaction eliminates a need for external input devices, such as touch-pads, providing the users with immediate access to HMD device functionalities without requiring any additional accessories. Beneficially, the wearable device is compact and lightweight in its design, making it ideal for on-the-go usage scenarios where portability and convenience of the user are paramount. The technical effect of implementing the touch-sensitive element on at least one of the aforementioned devices is that it improves an overall user interaction in terms of ease and convenience in providing touch inputs for interacting within the XR environment.

Notably, the at least one processor controls an overall operation of the system. The at least one processor is communicably coupled to at least the touch-sensitive element.

Optionally, the at least one processor is implemented on at least one of:
the head-mounted display device,
the accessory associated with the head-mounted display device,
a standalone device,
a wearable device,
a remote server.

The term "head-mounted display" device refers to specialized equipment that is configured to present an XR environment to the user when said head-mounted display (HMD) device, in operation, is worn by the user on his/her head. The HMD device is implemented, for example, as an XR headset, a pair of XR glasses, and the like, that is operable to display a visual scene of the XR environment to the user. Optionally, the at least one processor is implemented on a computing device that is communicably coupled to the HMD device. Examples of the computing device include, but are not limited to, a laptop, a tablet, a phablet, and a smartphone. The HMD device is well-known in the art. The term "accessory" refers to additional hardware or peripherals that are used in conjunction with the HMD device. Examples of the accessory, the standalone device, and the wearable device have been already discussed earlier. It will be appreciated that the remote server (namely, a cloud server) may provide a cloud computing service.

Throughout the present disclosure, the term "first touch input" refers to an initial touch input provided by the user on the touch-sensitive element. The first touch input is (continuously) provided for the time duration as indicated by the first time period. It will be appreciated that the phrase "a provision of a given touch input" refers to an act of physically touching (namely, contacting) a surface of the touch-sensitive element for providing the given touch input. Typically, the given touch input is provided by using a finger of a hand of the user. Optionally, when detecting the provision of the given touch input on the touch-sensitive element, the at least one processor is configured to process touch-sensing data, collected by the touch-sensitive element, to determine an activation of at least one touch-sensitive region of the touch-sensitive element, wherein the activation of the at least one touch-sensitive region is indicative of detection of the provisioning of the given touch input on the touch-sensitive element. The term "given touch input" encompasses at least the first touch input.

Throughout the present disclosure, the term "second touch input" refers to a subsequent touch input provided by the user on the touch-sensitive element within the first time period, following the first touch input. It will be appreciated that the second touch input is an intentional touch input provided on the touch-sensitive element within the first time period. It will be appreciated that detecting the provision of the first touch input on the touch-sensitive element is necessary to initiate a process of preventing the accidental touch input responses. This is because by detecting when the touch-sensitive element receives the first touch input, the system can detect a subsequent touch input (namely, the second touch input) within the first time period for performing a given functionality for the at least one of: the HMD device, the accessory associated with the HMD device. This allows the system to distinguish an intentional touch input from an accidental touch input. In other words, detecting whether the second touch input is provided during the first time period while the first touch input is still active, enables in generating the control signal to implement the given functionality. Beneficially, this facilitates in preventing unintended software events triggered by accidental touches on touch-sensitive areas that the user cannot see, for example, when the HMD device is worn by the user on his/her head. It will be appreciated that since the first touch input would be provided using one finger of the user, and the second touch input would be provided using another finger of the user whilst keep providing the first touch input using the one finger, a touch safety is ensured.

Optionally, the second touch input is any one of:
a single tap provided for less than or equal to a predefined time period,
a single tap provided for greater than a predefined time period,
a double tap,
a triple tap,
a polygonal-shaped tap,
a swipe tap provided along a given direction,
a rotational tap provided in a given direction.

The technical benefit of providing the second touch input in any of the aforesaid form is that it facilitates interacting within the XR environment presented by the HMD device accordingly. The term "tap" refers to a touch or a press on a touch-sensitive area of the touch-sensitive element to provide a given touch input. When the single tap is provided for less than or equal to the predefined time period, it may be considered to be a short tap (namely, a quick tap gesture). Similarly, when the single tap is provided for greater than the predefined time period, it may be considered to be a long tap (namely, a long tap gesture). Optionally, the predefined time period lies in a range of 1000 milliseconds (ms) to 1500 ms. As an example, the predefined time period may be from 1000, 1050, 1100, 1200 or 1300 ms up to 1300, 1400 or 1500 ms. The term "double tap" refers to two consecutive taps that are provided for less than or equal to the predefined time period on the touch-sensitive element (namely, two short taps). The double tap may be used to trigger a functionality, for example, such as zooming. The term "triple tap" refers to three consecutive short taps provided on the touch-sensitive element. The term "polygonal-shaped tap" refers to a tap gesture in a shape of a polygon, for example, such as a triangle, a square, or any other simple geometric shape. The term "swipe tap" refers to a tap gesture that is provided by swiping or dragging a finger of the user on the touch-sensitive area of the touch-sensitive element along the given direction. The swipe tap may be used for scrolling or navigating through a menu displayed on a display of the HMD device to a user. The "rotational tap" refers to a tap gesture that is provided via a rotational movement of the finger on the touch-sensitive element. The rotational tap may be used for rotating objects or adjusting some settings displayed on a display. The single tap, the double tap, the triple tap, the polygonal-shaped tap, the swipe tap, and the rotational tap are well-known in the art.

Notably, the control signal is generated from implementing the at least one functionality, based on the second touch input. Only when the second touch input is provided during the first time period, the at least one processor generates the control signal. It will be appreciated that the generation of the control signal may involve interpreting a nature (namely, a type) of the second touch input and mapping it to a given functionality from amongst a plurality of functionalities for the at least one of: the HMD device, the accessory associated with the HMD device. The aforesaid mapping, namely, which type of second touch input corresponds to (namely, implements) which functionality for the at least one of: the HMD device, the accessory associated with the HMD device, could be pre-known to the at least one processor. For example, when the second touch input is a swipe tap along a given direction, the at least one processor may interpret the second touch input as a command to navigate through a menu displayed on a display of the HMD device. It will be appreciated that when the touch-sensitive element is implemented on different devices (instead of only one device), a functionality corresponding to a second touch input that is provided on a touch-sensitive element of one device may be different from a functionality corresponding to a (same type of) second touch input that is provided on a touch-sensitive element of another device. Thus, when the touch-sensitive element is implemented on the different devices, different functionalities could be implemented simultaneously based on different second touch inputs. Moreover, without generation of the control signal, any touch input would remain merely as raw data and would not trigger any specific actions or functionalities for the at least one of: the HMD device, the accessory associated with the HMD device.

Optionally, the at least one functionality is at least one of:
- adjustment of a volume level of an audio device of the head-mounted display device,
- activation or deactivation of a microphone of the head-mounted display device,
- manipulating a user-interaction element of an interactive user interface displayed on a display of the head-mounted display device,
- navigating within the interactive user interface,
- switching between different operational modes of the head-mounted display device.

In this regard, the adjustment of the volume of the audio device of the HMD device may involve increasing or decreasing the volume level of the audio device. The audio device could, for example, be headphones of the HMD device. For example, the user is wearing the HMD device for virtual reality (VR) gaming. During a gameplay, the user may notice that sound effects are too loud, making it difficult to hear other audio cues. Thus, the user can simply perform the double tap or the swipe gesture on the touch-sensitive element of the HMD device to trigger a volume adjustment accordingly. Further, the activation or the deactivation of the microphone may involve turning the microphone to an ON start or an OFF state. For example, a single tap on the touch-sensitive element may activate the microphone hence allowing the user to engage in voice commands or communication. Similarly, a double tap could deactivate the microphone, ensuring privacy or conserving power when not in use.

The term "user-interaction element" refers to any feature within the interactive user interface that enables the users to interact with and manipulate digital content displayed on the display of the HMD device. The user-interaction element may include buttons, menus, sliders, checkboxes, text fields, icons, and other graphical or interactive elements that the user can engage with to perform actions or make selections, as and when required. Typically, user-interaction elements are essential for facilitating user engagement and interaction with XR software applications, thereby enabling the user to navigate, control, and customise the XR environment experience according to his/her needs and preferences. The manipulation of the user-interaction element may comprise various operations such as opening or closing of the user-interaction element, selecting or de-selecting the user-interaction element, changing an appearance of the user-interaction element, zooming in or zooming out of the user-interaction element, re-positioning the user-interaction element and the like. In an example, the users may initiate the opening or closing of the user-interaction element, for example, such as menus, dialog boxes, or collapsible panels, by performing specific touch gestures as the second touch input. In another example, the users may select or deselect specific elements within the interactive user interface, such as checkboxes, buttons, or other features in a given list. In yet another example, the users can modify the visual attributes or properties of the user-interaction element such as changing colours, sizes, shapes, or styles, to customize their appearance based on preferences or requirements based on the second touch input. In still another example, the users can adjust a scale or a magnification within the interactive user interface in order to focus on specific details or obtain a zoomed-in/zoomed-out view of visual content by performing pinch-to-zoom gestures or similar actions as the second touch input. In an example, the users may also relocate the user-interaction element within the interactive user interface to different locations or adjust their positioning relative to other user-interaction elements.

Moreover, navigating within the interactive user interface involves moving a cursor on the interactive user interface to reach to different parts of the display of the HMD device between different sections. In this regard, based on the second touch input, the user can perform various operations such as scrolling, swiping, tapping, gesturing and the like. In an example, the user can scroll vertically or horizontally through lists, menus, or pages to view additional content that extends beyond the initial viewport. In another example, the user can swipe left, right, up, or down to transition between different panels, screens, or tabs within the interactive user interface. In yet another example, the user can tap on the user-interactive element such as buttons, icons, or hyperlinks, to trigger specific actions or commands within the interactive user interface. In still another example, the user can perform predefined gestures or motions to execute specialized commands or navigate to specific destinations within the interactive user interface.

The different operational modes of the HMD device could be, for example, such as a virtual-reality (VR) mode, a mixed-reality (MR) mode, an augmented-reality (AR) mode, and a video-see-through (VST) mode. The different operational modes of the HMD device may enable the user to adjust their experience based on a level of interaction with digital content. The touch-sensitive element may detect the second touch input, which could be a specific gesture as mentioned earlier. For example, each gesture may be mapped to a corresponding operational mode switch like the single tap may switch between a VR mode and an AR mode, the double tap may activate an MR mode, or similar. Moreover, complex touch input combinations can also be used to trigger different operational modes of the HMD device. For example, a triple tap followed by a swipe tap could transition from a current mode to a VR mode. The technical effect of providing the at least one functionality improves a viewing experience of the user with the XR environment, and ensures efficient interaction within the XR environment.

Optionally, the method further comprises detecting a removal of the first touch input upon elapsing of the first time period, when it is detected that the second touch input is not provided on the touch-sensitive element during the first time period. In this regard, there may be a scenario where the first touch input is provided on the touch-sensitive element, but no second touch input may be provided during the first time period. In such a scenario, as soon as the user stops providing the first touch input (for example, by removing his/her finger from the touch-sensitive area), the first time period is considered to be elapsed, and the first touch input is considered to be removed. Thus, when the user again provides a (new) touch input (for example, using a same finger or a different finger), the touch-sensitive surface would detect/recognise said touch input as the (new) first touch input that corresponds to the (new) first time period. This is because the second touch input would only be detected when the first touch input is continuously active for the first time period. Beneficially, this facilitates in accurately and conveniently detecting multiple first touch inputs and multiple second touch inputs, during a given session of using the system.

The present disclosure also relates to the system as described above. Various embodiments and variants disclosed above, with respect to the aforementioned first aspect, apply mutatis mutandis to the system.

Optionally, in the system, the at least one processor is configured to detect a removal of the first touch input upon elapsing of the first time period, when it is detected that the second touch input is not provided on the touch-sensitive element during the first time period.

Optionally, in the system, the second touch input is any one of:
- a single tap provided for less than or equal to a predefined time period,
- a single tap provided for greater than a predefined time period,
- a double tap,
- a triple tap,
- a polygonal-shaped tap,
- a swipe tap provided along a given direction,
- a rotational tap provided in a given direction.

Optionally, in the system, the at least one functionality is at least one of:
- adjustment of a volume level of an audio device of the head-mounted display device,
- activation or deactivation of a microphone of the head-mounted display device,
- manipulate a user-interaction element of an interactive user interface displayed on a display of the head-mounted display device,
- navigate within the interactive user interface,
- switch between different operational modes of the head-mounted display device.

DETAILED DESCRIPTION OF THE DRAWINGS

Referring to FIG. 1, illustrated are steps of a method for preventing accidental touch input responses, in accordance with an embodiment of the present disclosure. With reference to FIG. 1, at step 102, a provision of a first touch input is detected on a touch-sensitive element. At step 104, it is detected whether a second touch input is provided on the touch-sensitive element during a first time period, wherein the first time period is a time duration in which the first touch input is provided. When it is detected that the second touch input is provided on the touch-sensitive element during the first time period, at step 106, a control signal for implementing at least one functionality for a head-mounted display device is generated, based on the second touch input.

The aforementioned steps are only illustrative and other alternatives can also be provided where one or more steps are added, one or more steps are removed, or one or more steps are provided in a different sequence without departing from the scope of the claims herein.

Figure 2:
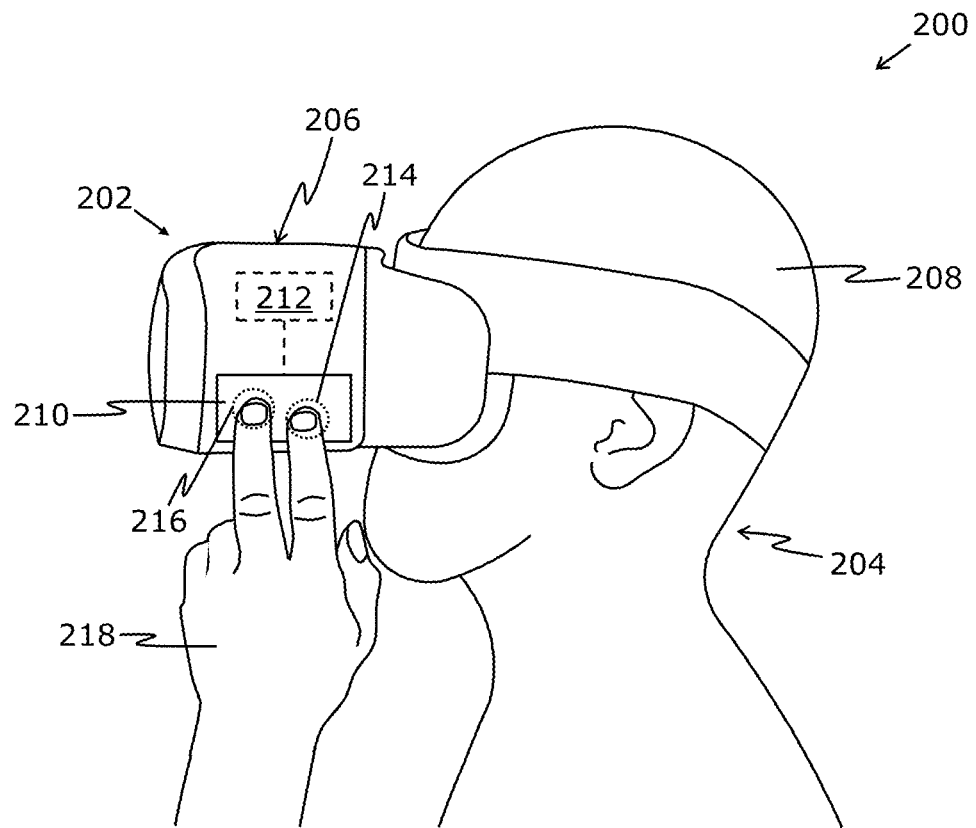
FIG. 2 illustrates an exemplary environment in which a system for preventing accidental touch input responses is employed, in accordance with an embodiment of the present disclosure.

Referring to FIG. 2, illustrated is an exemplary environment 200 in which a system 202 for preventing accidental touch input responses is employed, in accordance with an embodiment of the present disclosure. With reference to FIG. 2, a user 204 is shown to be present in the environment 200, wherein the user 204 is wearing a head-mounted display (HMD) device 206 on his/her head 208. The system 202 comprises a touch-sensitive element 210 and at least one processor (for example, depicted as a processor 212) coupled to the touch-sensitive element 210. The processor 212 is configured to: detect a provision of a first touch input 214 on the touch-sensitive element 210; detect whether a second touch input 216 is provided on the touch-sensitive element 210 during a first time period, wherein the first time period is a time duration in which the first touch input 214 is provided; and generate a control signal for implementing at least one functionality for a head-mounted display device 206 based on the second touch input 216, when it is detected that the second touch input 216 is provided on the touch-sensitive element 210 during the first time period. Further, the processor 212 is optionally configured to detect a removal of the first touch input 214 upon elapsing of the first time period, when it is detected that the second touch input 216 is not provided on the touch-sensitive element 210 during the first time period. It will be appreciated that the first touch input 214 and the second touch input 216 are provided on the touch-sensitive element 210 by a first finger and a second finger of a hand 218 of the user 204, respectively.

Figure 3:
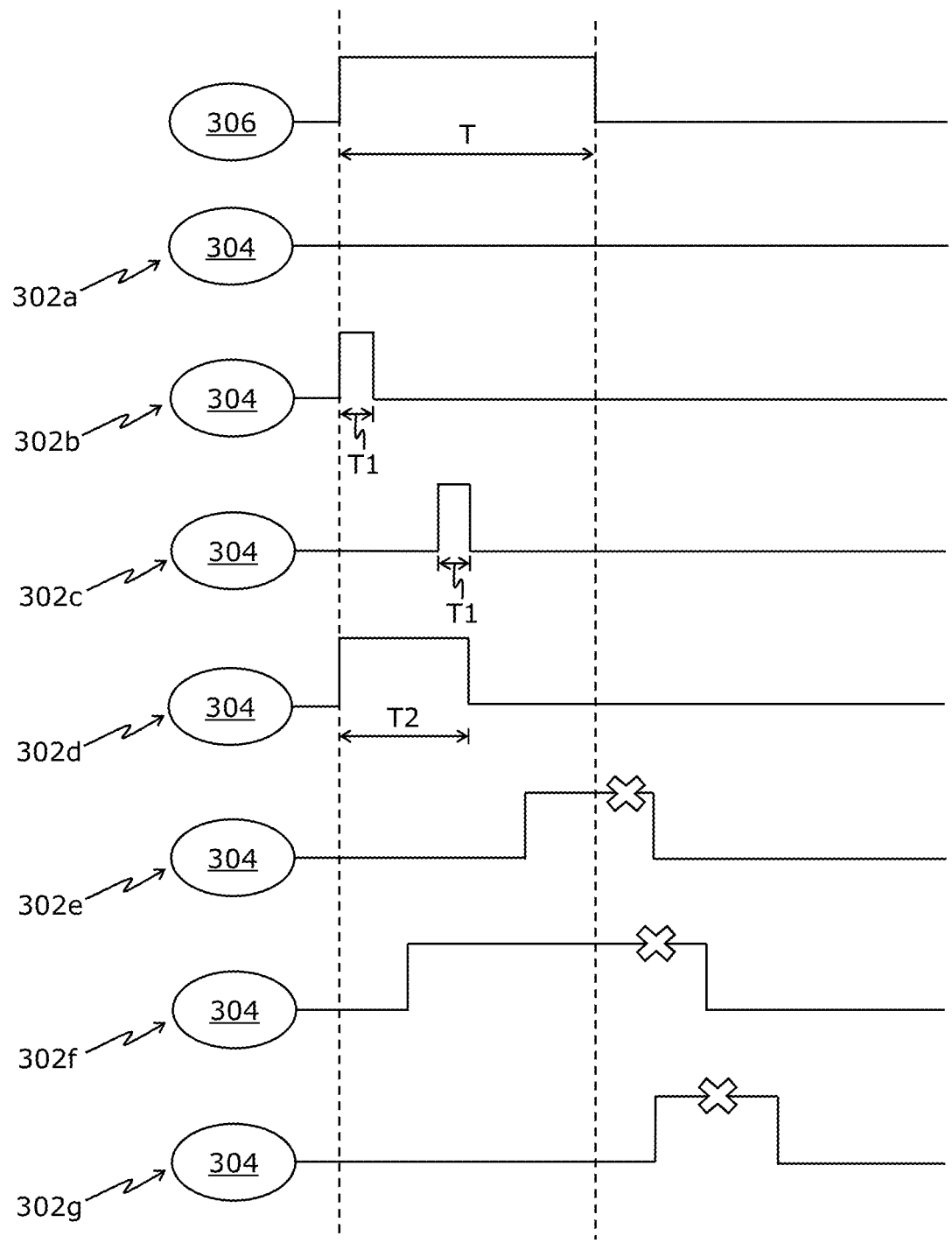
FIG. 3 illustrates various scenarios of how a second touch input is provided on a touch-sensitive element, in accordance with an embodiment of the present disclosure.

Referring to FIG. 3, illustrated are various scenarios 302a, 302b, 302c, 302d, 302e, 302f, and 302g of how a second touch input 304 is provided on a touch-sensitive element, in accordance with an embodiment of the present disclosure. With reference to FIG. 3, for each of the scenarios 302a-g, prior to providing the second touch input 304 on the touch-sensitive element, a first touch input 306 is provided on the touch-sensitive element for a first time period T. Thus, for sake of simplicity and clarity, a control signal indicative of a detection of the first touch input 306 is shown only once in FIG. 3. It is to be noted that upon elapsing of the first time period T, a removal of the first touch input 306 is detected. In the scenario 302a, the second touch input 304 is not provided within the first time period T at all. Therefore, no control signal is generated by at least one processor for implementing any functionality for a head-mounted display (HMD) device. In the scenarios 302b-c, the second touch input 304 is provided within the first time period T for a time duration T1 which is less than or equal to a predefined time period (for example, 1500 milliseconds). In other words, the second touch input 304 is provided as a short tap in the scenarios 302b-c. Therefore, a control signal is generated by the at least one processor accordingly. In the scenario 302d, the second touch input 304 is provided within the first time period T for a time duration T2 which is greater than the predefined time period. In other words, the second touch input 304 is provided as a long tap in the scenario 302d. Therefore, a control signal is generated by the at least one processor accordingly. In the scenarios 302e and 302f, the second touch input 304 is provided partially within the first time period T. In other words, the second touch input 304 is continuously provided even upon elapsing of the first time period T. Therefore, a control signal corresponding to only a part of the second touch input 304 provided within the first time period T, is generated by the at least one processor accordingly. A remaining part of the second touch input 304 provided upon elapsing of the first time period T is not detected and no control signal is generated (as shown using cross ('x') shape, only for sake of better understanding). Similarly, in the scenario 302g, the second touch input 304 is provided upon elapsing of the first time period T. In such a case, the second touch input 304 is not detected at all, and no control signal is generated (as shown using cross ('x') shape, only for sake of better understanding).

FIGS. 2 and 3 are merely examples, which should not unduly limit the scope of the claims herein. A person skilled in the art will recognize many variations, alternatives, and modifications of embodiments of the present disclosure.

The invention claimed is:
1. A method for preventing accidental touch input responses, the method comprising:

detecting a provision of a first touch input on a touch-sensitive element;

detecting whether a second touch input is provided on the touch-sensitive element during a first time period, wherein the first time period is a time duration in which the first touch input is provided; and generating a control signal for implementing at least one functionality for at least one of: a head-mounted display device, an accessory associated with the head-mounted display device, based on the second touch input, when it is detected that the second touch input is provided on the touch-sensitive element during the first time period.

2. The method of claim 1, further comprising detecting a removal of the first touch input upon elapsing of the first time period, when it is detected that the second touch input is not provided on the touch-sensitive element during the first time period.

3. The method of claim 1, wherein the second touch input is any one of:
 a single tap provided for less than or equal to a predefined time period,
 a single tap provided for greater than a predefined time period,
 a double tap,
 a triple tap,
 a polygonal-shaped tap,
 a swipe tap provided along a given direction,
 a rotational tap provided in a given direction.

4. The method of claim 1, wherein the at least one functionality is at least one of:
 adjustment of a volume level of an audio device of the head-mounted display device,
 activation or deactivation of a microphone of the head-mounted display device,
 manipulating a user-interaction element of an interactive user interface displayed on a display of the head-mounted display device,
 navigating within the interactive user interface,
 switching between different operational modes of the head-mounted display device.

5. A method of claim 1, wherein the touch-sensitive element is implemented on at least one of:
 a side of the head-mounted display device,
 the accessory associated with the head-mounted display device,
 a standalone device,
 a wearable device.

6. A system for preventing accidental touch input responses, wherein the system comprises:
 a touch-sensitive element; and
 at least one processor coupled to the touch-sensitive element, wherein the at least one processor is configured to:
  detect a provision of a first touch input on the touch-sensitive element;
  detect whether a second touch input is provided on the touch-sensitive element during a first time period, wherein the first time period is a time duration in which the first touch input is provided; and
  generate a control signal for implementing at least one functionality for at least one of: a head-mounted display device, an accessory associated with the head-mounted display device, based on the second touch input, when it is detected that the second touch input is provided on the touch-sensitive element during the first time period.

7. The system of claim 6, wherein the at least one processor is implemented on at least one of:
 the head-mounted display device,
 the accessory associated with the head-mounted display device,
 a standalone device,
 a wearable device,
 a remote server.

8. The system of claim 6, wherein the at least one processor is configured to detect a removal of the first touch input upon elapsing of the first time period, when it is detected that the second touch input is not provided on the touch-sensitive element during the first time period.

9. The system of claim 6, wherein the second touch input is any one of:
 a single tap provided for less than or equal to a predefined time period,
 a single tap provided for greater than a predefined time period,
 a double tap,
 a triple tap,
 a polygonal-shaped tap,
 a swipe tap provided along a given direction,
 a rotational tap provided in a given direction.

10. The system of claim 6, wherein the at least one functionality is at least one of:
 adjustment of a volume level of an audio device of the head-mounted display device,
 activation or deactivation of a microphone of the head-mounted display device,
 manipulate a user-interaction element of an interactive user interface displayed on a display of the head-mounted display device,
 navigate within the interactive user interface,
 switch between different operational modes of the head-mounted display device.

* * * * *